(12) United States Patent
Nitsch et al.

(10) Patent No.: US 11,003,797 B2
(45) Date of Patent: May 11, 2021

(54) SUBSCRIPTION MANAGEMENT COMPRISING SUBSCRIPTION-SPECIFIC PROFILES FOR RESTRICTING THE FUNCTIONALITIES OF THE SECURITY ELEMENT

(71) Applicant: GIESECKE+DEVRIENT MOBILE SECURITY GMBH, München (DE)

(72) Inventors: Nils Nitsch, Markt Schwaben (DE); Michael Schnellinger, Landshut (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 224 days.

(21) Appl. No.: 15/739,509

(22) PCT Filed: Jun. 22, 2016

(86) PCT No.: PCT/EP2016/001065
§ 371 (c)(1),
(2) Date: Dec. 22, 2017

(87) PCT Pub. No.: WO2016/206806
PCT Pub. Date: Dec. 29, 2016

(65) Prior Publication Data
US 2018/0189506 A1 Jul. 5, 2018

(30) Foreign Application Priority Data
Jun. 23, 2015 (DE) ..................... 10 2015 008 117.9

(51) Int. Cl.
G06F 21/62 (2013.01)
H04W 4/60 (2018.01)
(Continued)

(52) U.S. Cl.
CPC ............ *G06F 21/629* (2013.01); *H04W 4/60* (2018.02); *H04W 8/18* (2013.01); *H04W 8/183* (2013.01);
(Continued)

(58) Field of Classification Search
CPC .......... G06F 21/629; G06F 2221/2141; H04W 4/60; H04W 8/18; H04W 12/08; H04W 8/183
See application file for complete search history.

(56) References Cited

U.S. PATENT DOCUMENTS 6,961,587 B1 11/2005 Vilppula et al.
7,953,445 B2 * 5/2011 Brown ................. H04W 8/245
455/558
(Continued)

FOREIGN PATENT DOCUMENTS

DE 60015748 T2 11/2005
DE 102013006621 A1 10/2014
(Continued)

OTHER PUBLICATIONS

I. Podnar, M. Hauswirth and M. Jazayeri, "Mobile push: delivering content to mobile users," Proceedings 22nd International Conference on Distributed Computing Systems Workshops, Vienna, Austria, 2002, pp. 563-568. (Year: 2002).*
(Continued)

*Primary Examiner* — Robert B Leung
*Assistant Examiner* — Sameera Wickramasuriya
(74) *Attorney, Agent, or Firm* — Workman Nydegger

(57) ABSTRACT

A method and a system for subscription management in a security element for a mobile end device, wherein one subscription profile is associated with one subscription. For
(Continued)

a subscription profile, an access to functionalities of the security element is subscription-profile-specifically restricted.

13 Claims, 1 Drawing Sheet

(51) Int. Cl.
*H04W 12/08* (2021.01)
*H04W 8/18* (2009.01)

(52) U.S. Cl.
CPC ..... *H04W 12/08* (2013.01); *G06F 2221/2141* (2013.01)

(56) References Cited

U.S. PATENT DOCUMENTS

| | | | |
|---|---|---|---|
| 8,001,375 B2 | 8/2011 | Hattori et al. | |
| 9,098,714 B2 | 8/2015 | Sharp et al. | |
| 9,116,768 B1* | 8/2015 | Sawhney | G06F 8/60 |
| 9,253,588 B2 | 2/2016 | Schmidt et al. | |
| 9,262,645 B2* | 2/2016 | Biswas | H04W 12/02 |
| 9,378,383 B2* | 6/2016 | Sand-Soll | G06F 16/22 |
| 9,608,989 B2 | 3/2017 | Corda et al. | |
| 9,626,520 B2 | 4/2017 | Sharp et al. | |
| 10,311,246 B1* | 6/2019 | Paczkowski | G06F 12/1416 |
| 2005/0070321 A1* | 3/2005 | Weigele | H04W 8/265 |
| | | | 455/517 |
| 2006/0253894 A1* | 11/2006 | Bookman | H04L 63/08 |
| | | | 726/2 |
| 2008/0039134 A1 | 2/2008 | Hattori et al. | |
| 2009/0077643 A1 | 3/2009 | Schmidt et al. | |
| 2010/0031366 A1* | 2/2010 | Knight | G06Q 10/10 |
| | | | 726/26 |
| 2010/0205432 A1 | 8/2010 | Corda et al. | |
| 2012/0331292 A1* | 12/2012 | Haggerty | H04L 63/0272 |
| | | | 713/168 |
| 2013/0145429 A1* | 6/2013 | Mendel | G06F 21/00 |
| | | | 726/4 |
| 2013/0165073 A1* | 6/2013 | Madsen | H04W 8/18 |
| | | | 455/411 |
| 2013/0210484 A1 | 8/2013 | Jeenagala et al. | |
| 2013/0227646 A1* | 8/2013 | Haggerty | H04L 63/0853 |
| | | | 726/3 |
| 2014/0040979 A1* | 2/2014 | Barton | H04L 63/20 |
| | | | 726/1 |
| 2014/0143826 A1 | 5/2014 | Sharp et al. | |
| 2014/0331279 A1* | 11/2014 | Aissi | G06F 21/53 |
| | | | 726/1 |
| 2015/0312873 A1* | 10/2015 | Cormier | H04W 88/06 |
| | | | 455/432.1 |
| 2016/0063260 A1 | 3/2016 | Sharp et al. | |
| 2016/0094560 A1* | 3/2016 | Stuntebeck | H04L 63/102 |
| | | | 726/1 |
| 2016/0226860 A1 | 8/2016 | Schmidt et al. | |

FOREIGN PATENT DOCUMENTS

| | | |
|---|---|---|
| JP | 2010034912 A | 2/2010 |
| JP | 2010541059 A | 12/2010 |
| JP | 2013242878 A | 12/2013 |
| JP | 2015513821 A | 5/2015 |
| JP | 2016505929 A | 2/2016 |
| WO | 0069183 A2 | 11/2000 |
| WO | 2005121975 A1 | 12/2005 |
| WO | 2014081890 A1 | 5/2014 |

OTHER PUBLICATIONS

H. Jafarpour, S. Mehrotra and N. Venkatasubramanian, "A Fast and Robust Content-based Publish/Subscribe Architecture," 2008 Seventh IEEE International Symposium on Network Computing and Applications, Cambridge, MA, USA, 2008, pp. 52-59, doi: 10.1109/NCA.2008.51. (Year: 2008).*
German Search Report from DE Application No. 10 2015 008 117.9, dated Feb. 18, 2016.
International Search Report from PCT Applilcation No. PCT/EP2016/001065, dated Aug. 8, 2016.
International Preliminary Report on Patentability from PCT Application No. PCT/EP2016/001065, dated Dec. 26, 2017.
Extended European Search Report from EP Application No. 16731804.7, dated Jan. 23, 2019.
Japanese Office Communication from JP Application No. 2017-567449, dated Jan. 30, 2019.
"Metadaten," retrieved from https://de.wikipedia.org/w/index.php?title=Metadaten&oldid=142121865 on Sep. 12, 2019, 14 Pages.
European Office Action from EP Application No. 16731804.7, dated Sep. 19, 2019.

* cited by examiner

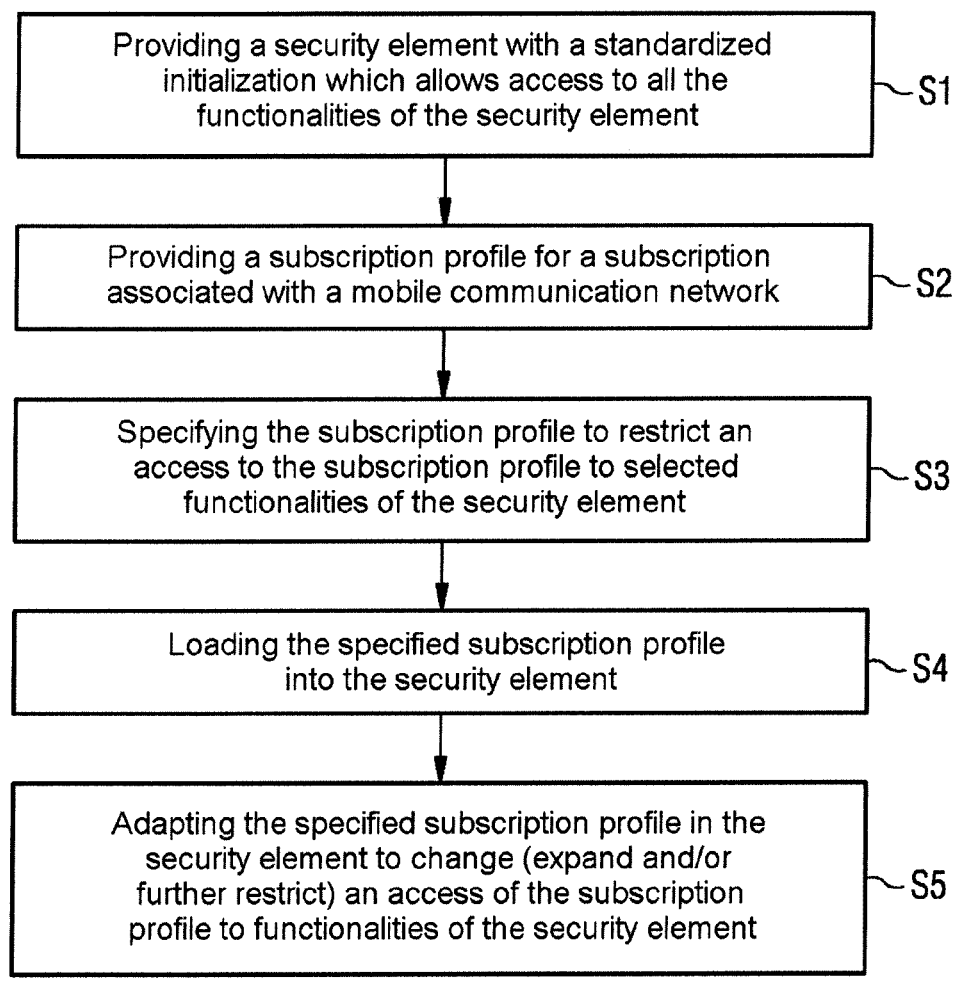

SUBSCRIPTION MANAGEMENT COMPRISING SUBSCRIPTION-SPECIFIC PROFILES FOR RESTRICTING THE FUNCTIONALITIES OF THE SECURITY ELEMENT

BACKGROUND

The present invention relates to a method for subscription management. More precisely, the invention relates to a method for managing subscriptions in a security element for a mobile end device.

Respectively one subscription profile is therefore associated with one subscription. Such a subscription profile is then stored in the security element as a data set or application. The subscription profile defines conditions, i.e. e.g. type, extent and costs, of a utilization by means of the security element of a mobile communication network associated with the subscription and of the mobile end device into which the security element is integrated.

Different subscriptions request in different ways functionalities of the security element, in which the subscription profile associated with the subscription is stored. A "simple" subscription, which for example allows merely a data transfer according to a pre-specified maximum volume via the mobile communication network associated with the subscription, requires very few functionalities of the security element. An "extensive" subscription, however, which for example allows a user to utilize practically all services supplied on the part of the mobile communication network (e.g. mobile communication, SMS, Internet) to the full extent, requires also numerous complex functionalities supplied on the part of the security element, for example cryptographic functionalities or access to a module for the contactless data communication (e.g. via NFC).

Because a subscription profile or applications executable within such a subscription profile in the security element can in principle utilize all functionalities of the security element supplied within the scope of an initialization of the security element, an access of a subscription to a functionality not required for the subscription can be restricted (e.g. for security reasons) only by coordinating an initialization of the security element to a subscription to be loaded onto the security element. On the one hand this is elaborate because respectively different initializations of a security element must be generated for different subscriptions. On the other hand this is then problematic if hereafter a further subscription is to be loaded onto the security element which differs from the already loaded subscription with regard to the access to functionalities of the security element necessary for operating the subscription.

SUMMARY

The object of the present invention is thus to take into account the problems mentioned hereinabove.

The basic idea of the present invention is to subscription-profile-specifically restrict the access of a subscription profile to functionalities of the security element. In other words, a subscription profile itself comprises, after a suitable modification, the information item as to which functionalities of the security element are accessible for the subscription profile.

According to a preferred embodiment of a method for subscription management in a security element for a mobile end device, in which respectively a subscription profile stored or storable in the security element is associated with a subscription, an access of such a subscription profile to functionalities of the security element, which in principle are available in the security element, is subscription-specifically restricted. In other words, a subscription profile is specified or modified or supplemented such that thereby an access of the subscription profile to functionalities of the security element can be stated, i.e. in particular also be restricted.

Here, an access of an application, said application being associated with the subscription profile and executable in the security element within a subscription profile, to functionalities of the security element is preferably subscription-profile-specifically restricted.

According to a preferred embodiment, the functionalities of the security element are supplied by programming interfaces of the security element so that the restriction of the access to the functionalities is realized as a restriction of the access or opportunity for utilization to programming interfaces of the security element.

According to a preferred embodiment, the metadata specifying the subscription profile are generated for a pre-specified subscription profile. These metadata can be generated in particular as an header information item which, if the subscription profile is regarded as a data set, are present as components of the data set specifying the data set, as a rule at the beginning of the data set.

Such metadata can be stored in the security element on the one hand as a part of a modified subscription profile, or as an additional data set associated with the subscription profile, i.e. separate from the subscription profile.

These metadata specifying the subscription profile then designate those functionalities of the security element which the subscription profile or applications executable within the subscription profile can access.

Alternatively or additionally, the metadata can also designate such functionalities of the security element which cannot be employed on the part of the subscription profile, i.e. to which an access is refused by the subscription profile.

According to a preferred variant, the metadata designate those programming interfaces (API) of the security element which the subscription profile or applications executable within the subscription profile can access (or not access). In this manner, those functionalities are thus indirectly designated which the subscription profile can access (or not access) via the designating APIs.

Here, the metadata can be generated on the one hand already before the loading of the subscription profile into the security element and then be loaded together with the subscription profile into the security element or be stored therein.

Alternatively or additionally, it can likewise be provided that the metadata are generated only then and are stored in the security element or are changed in the security element after the subscription profile has already been loaded into the security element. Such a subsequent supplementation or change of the metadata can be effected for example via an over-the-air interface. In this manner an access of a subscription profile to functionalities of the data carrier can subsequently be adapted, whereby it can be flexibly reacted to for example a change of the subscription, i.e. a change or adaptations of the conditions for the utilization of the mobile communication network.

As a rule, a manufacturer or an issuer of the security element in the role of a subscription administrator or subscription manager will subscription-specifically restrict an access of a specific subscription profile to functionalities of the security element in the described manner. In other words, as a rule it is incumbent upon the manufacturer or issuer of the security element to generate the hereinabove described metadata specifying the subscription profile and to store or adapt said metadata in the security element. An operator of a mobile communication network, which a subscription is associated with, is as a rule not authorized and technically not able to define or influence an access of a subscription profile to functionalities of the security element on the basis of a subscription profile.

The substantial advantage of the inventive concept, according to which an access of a subscription profile to functionalities of a security element can be subscription-profile-specifically limited, lies therein that a manufacturer of a security element can standardizes and initialize the security element in its entirety, regardless of the subscriptions to be subsequently loaded thereon. An access of the subscriptions then later loaded onto the security element to individual functionalities of the security element can then be restricted subscription-specifically for each subscription in the hereinabove described manner.

In this manner it becomes possible that each subscription obtains through the subscription profile a pre-specified, limited access to functionalities of the security element which can be different from subscription to subscription. The manufacture of the security element is therefore simplified, because this can always be initialized according to a standard. Nevertheless, for each subscription loaded—even subsequently—onto the security element, an access to functionalities of the security element tailored specifically to the subscription can be guaranteed.

A preferred embodiment of an inventive security element for a mobile end device, in which security element one subscription profile is stored for at least one subscription, is characterized by the fact that an access of the subscription profile to functionalities of the security element is subscription-profile-specifically restricted.

As already indicated, metadata specifying the subscription profile for a subscription profile stored in the security element can additionally be stored in the security element. Preferably these metadata designate positively those functionalities or those programming interfaces of the security element which the subscription profile can access. Alternatively or additionally, the metadata can also designate negatively those functionalities and/or programming interfaces which the subscription profile cannot access.

An inventive mobile end device comprises a hereinabove described security element. Here, the security element can be removably integrated into the end device, for example in the form of a SIM/UICC mobile communication card, or firmly incorporated in the end device, e.g. as an embedded SIM/UICC.

A preferred embodiment of an inventive system comprises a subscription management device as well as at least one security element for a mobile end device of the described kind. The subscription management device is devised to specify a subscription profile, which is stored in the security element or is storable in the security element, such that thereby an access of the subscription profile to functionalities present in the security element is restricted.

The subscription management device is preferably arranged at a manufacturer or an issuer of the security element. An operator of a mobile communication network associated with a subscription has as a rule organizationally and technically no possibility to influence via a subscription profile an access of the subscription profile to functionalities of the security element.

The subscription management device is preferably devised to generate metadata specifying the subscription profile for a pre-specified subscription profile, in particular in the form of header information items or the like, and to store said metadata in the security element as a complementary component of the subscription profile or in addition to the subscription profile. These metadata designate an access of the subscription profile to the security element in the manner already described in detail hereinabove.

The subscription management device is ultimately devised to subsequently change or adapt corresponding metadata stored in the security element. In general, the subscription management device is devised to subsequently adapt a subscription profile stored in the security element to the effect that thereby the access of the subscription profile to functionalities of the security element is restricted.

BRIEF DESCRIPTION OF THE DRAWINGS

The invention will hereinafter be described by way of example with reference to the attached figure. Said FIG. 1 states steps of a preferred embodiment of a method for subscription management in a security element for a mobile end device.

DETAILED DESCRIPTION OF VARIOUS EMBODIMENTS

In a first step S1, a security element having a standardized initialization is supplied.

This initialization in principle allows access to all functionalities of the security element for a subscription profile which can be loaded into the security element.

A security element as intended by the present invention is in particular a conventional SIM/UICC mobile communication card, an embedded SIM/UICC, or any other security element which is suitable to store a subscription profile for a subscription for utilizing a mobile communication network in secure manner.

In a second step S2, a subscription profile is supplied to a subscription associated with a mobile communication network. Such a subscription profile defines conditions (type, extent, costs, etc.) of a utilization of services which are supplied by a mobile communication network associated with the subscription.

The subscription profile is now specified in step S3. In this manner, an access of the subscription profile or applications executable within such a subscription profile can be restricted to selected functionalities of the security element.

According to a preferred variant, the specification of the subscription profile is effected by the fact that metadata are generated for the subscription profile, for example header information items, which are prefixed to the subscription profile.

Hereafter a possible encoding of a subscription profile thus specified is stated by way of example in the form of an XML file. Here, the actual, original subscription profile is merely indicated concisely in the last three lines ("profile data"). The "ProfileHeader" stated in the example corresponds to the metadata described hereinabove.

```
<?ProfilePackageVersion = "1.0"?>
<ProfileHeader MAC="AABBCCDDEEFF001122334455">
    <AllowedAPIs>
        <Aid Name="javacard.framework" Value=" A0 00 00 00 62 01 01"></Aid> //All APIs available
<Aid Name="javacard.security" Value=" A0 00 00 00 62 02 01">
    <SubFunctionality Name="DES"/> //DES ciphering allowed
```

-continued

```
<SubFunctionality Name="RSA"/> //RSA ciphering allowed
    //AES and ECC forbidden
</Aid>
<Aid Name="org.globalplatform" Value=" A0 00 00 01 51 00"></Aid>
//All APIs available
    </ AllowedAPIs>
</ ProfileHeader>
<ProfileData>
    //Ciphered and MACed profile data
</ProfileData>
```

For example it can be seen from the hereinabove shown example that for the subscription profile, programming interfaces of the security element which the subscription profile can access are stated positively. In the shown example, these are all APIs of the "javacard.framework". Further individual functionalities from the region "javacard.security" are accessible (e.g. encryption and decryption by means of RSA and DES), others of these are not accessible (e.g. encryption and decryption by means of AES and ECC).

It will be appreciated that the stated example is to be understood merely exemplary and that an implementation of a header data set can be effected in a different manner.

In general, those functionalities which a subscription profile can access and which are subscription-profile-specifically designated according to the present invention and thereby restricted, concern such functionalities which can be called up by a subscription profile or by an application executed within the subscription profile as an auxiliary functionality, such as cryptographic functionalities. In contrast, functionalities of the security element which are directed toward a change of the security element itself or to a change of the functionality of the security element are as a rule not be embraced by the present invention.

In step 4, such a specified subscription profile, in particular together with the metadata generated for the subscription profile, can then be loaded into the security element or be stored therein.

While the security element is already employed in accordance with the requirements, that is it is used integrated in a mobile end device, an adapting, as represented with reference to step S5, of the specified subscription profile can be effected in the security element. Thereby, an access of a subscription profile to functionalities of the security element can be changed subsequently. Such a change can mean on the one hand an extension of the access, on the other hand a further restriction of the access.

The invention claimed is:

1. A method for subscription management in a security element for a mobile end device, the method comprising:
   initializing the secure element with a standard initialization, the standard initialization allowing access to functionalities of the secure element to a plurality of subscriptions that can be loaded into the secure element, wherein access to the functionalities of the secure element varies among the plurality of subscriptions, wherein the standard initialization allows access to the functionalities of the secure element to a first subscription of the plurality of subscriptions while also allowing access to the functionalities of the secure element to a second subscription of the plurality of subscriptions that is loaded later onto the security element than the standard initialization,
   assigning a subscription profile to a subscription of the plurality of subscriptions in the security element,
   providing access of the subscription profile to functionalities of the security element in a manner that is specific to the subscription profile, the subscription profile defining conditions of use of a mobile radio network assigned to the subscription by means of the secure element and the mobile end device, and
   providing access of an application executable in the security element and associated with the subscription profile to the functionalities of the security element in the manner that is specific to the subscription profile,
   wherein information about which functionalities of the security element are accessible for the subscription profile are included in the subscription profile itself, and where the subscription profile with the information about the accessible functionalities is loaded into the secure element.

2. The method according to claim 1, wherein the functionalities of the security element are supplied by programming interfaces of the security element.

3. The method according to claim 1, wherein for a pre-specified subscription profile, metadata for specifying the subscription profile are generated which designate those functionalities of the security element which the subscription profile can access;
   wherein the functionalities of the security element are supplied by programming interfaces of the security element.

4. The method according to claim 1, wherein for a pre-specified subscription profile, metadata for specifying the subscription profile are generated which designate those functionalities of the security element which the subscription profile cannot access;
   wherein the functionalities of the security element are supplied by programming interfaces of the security element.

5. The method according to claim 3, wherein the metadata are generated before the loading of the subscription profile into the security element or that the metadata are generated or are changed after the subscription profile has been already loaded into the security element.

6. The method according to claim 1, wherein a manufacturer or issuer of the security element subscription-specifically restricts the access of a subscription profile to functionalities of the security element.

7. A hardware security element for a mobile end device, the hardware security element comprising:
   a storage configured to store at least one subscription profile that is assigned to a subscription of a plurality of subscriptions associated with the security element,
   the hardware security element being initialized with a standard initialization, the standard initialization allowing access to functionalities of the secure element to the plurality of subscriptions that can be loaded into the storage of hardware security element, wherein access to the functionalities of the hardware security element varies among the plurality of subscriptions, wherein the standard initialization allows access to the functionalities of the secure element to a first subscription of the plurality of subscriptions while also allowing access to the functionalities of the secure element to a second subscription of the plurality of subscriptions that is loaded later onto the security element than the standard initialization,
   the hardware security element configured to:
   provide access of the subscription profile to functionalities of the security element in a manner that is specific to the subscription profile, the subscription profile defining conditions of use of a mobile radio network assigned to the subscription by means of the hardware security element and the mobile end device, and provide access of an application executable in the security element and associated with the subscription profile to the functionalities of the security element in the manner that is specific to the subscription profile, wherein information about which functionalities of the security element are accessible for the subscription profile are included in the subscription profile itself, wherein an access of the subscription profile to functionalities of the security element is subscription-profile-specifically restricted, and where the subscription profile with the information about the accessible functionalities is loaded into the hardware security element.

8. The security element according to claim 7, wherein in the storage of the security element additional metadata are stored for the subscription profile stored in the security element, which designate those functionalities or those programming interfaces of the security element which the subscription profile can access and/or which designate those functionalities or those programming interfaces of the security element which the subscription profile cannot access.

9. A mobile end device having a security element according to claim 7.

10. A system, comprising:
a subscription management device and at least one security element for a mobile end device, the security element being initialized with a standard initialization, the standard initialization allowing access to functionalities of the secure element to the plurality of subscriptions that can be loaded into the storage of hardware security element, wherein access to the functionalities of the security element varies among the plurality of subscriptions, wherein the standard initialization allows access to the functionalities of the secure element to a first subscription of the plurality of subscriptions while also allowing access to the functionalities of the secure element to a second subscription of the plurality of subscriptions that is loaded later onto the security element than the standard initialization, wherein a subscription profile is assigned to a subscription of the plurality of subscriptions within the security element, the subscription profile defining conditions of use of a mobile radio network assigned to the subscription by means of the security element and the mobile end device, wherein the subscription management device is configured to specify the subscription profile in such a way that access of the subscription profile and of an application executable in the security element and associated with the subscription profile to functionalities of the security element are limited in a manner that is specific to the subscription profile, wherein information about which functionalities of the security element are accessible for the subscription profile are included in the subscription profile itself, and where the subscription profile with the information about the accessible functionalities is loaded into the secure element.

11. The system according to claim 10, wherein the subscription management device is devised to generate metadata for a pre-specified subscription profile which designate those functionalities or those programming interfaces of the security element which the subscription profile can access and/or which designate those functionalities or those programming interfaces of the security element which the subscription profile cannot access.

12. The system according to claim 10, wherein the subscription management device is devised to store the specified subscription profile in the security element and/or to change a subscription profile already stored in the security element.

13. The system according to claim 10, wherein the subscription management device is arranged at a manufacturer or issuer of the security element.

* * * * *